United States Patent
Showalter

(10) Patent No.: US 9,803,611 B2
(45) Date of Patent: Oct. 31, 2017

(54) ANTI-KICKBACK CLUTCH FOR STARTER GEAR

(71) Applicant: BorgWarner Inc., Auburn Hills, MI (US)

(72) Inventor: Dan J. Showalter, Plymouth, MI (US)

(73) Assignee: BORGWARNER INC., Auburn Hills, MI (US)

( * ) Notice: Subject to any disclaimer, the term of this patent is extended or adjusted under 35 U.S.C. 154(b) by 324 days.

(21) Appl. No.: 14/589,253

(22) Filed: Jan. 5, 2015

(65) Prior Publication Data

US 2015/0198131 A1     Jul. 16, 2015

Related U.S. Application Data

(60) Provisional application No. 61/925,868, filed on Jan. 10, 2014.

(51) Int. Cl.

| | | |
|---|---|---|
| F02N 15/00 | (2006.01) | |
| F02N 15/02 | (2006.01) | |
| F16C 43/04 | (2006.01) | |
| F16D 41/067 | (2006.01) | |
| F02N 11/00 | (2006.01) | |

(52) U.S. Cl.
CPC ............ *F02N 15/023* (2013.01); *F16C 43/04* (2013.01); *F16D 41/067* (2013.01); *F02N 11/00* (2013.01); *Y10T 29/4968* (2015.01); *Y10T 74/134* (2015.01)

(58) Field of Classification Search
CPC ....... F02N 15/023; F16C 43/04; F16D 41/067
See application file for complete search history.

(56) References Cited

U.S. PATENT DOCUMENTS

| | | | |
|---|---|---|---|
| 2,421,814 A | 6/1947 | Starkey | |
| 5,279,400 A | 1/1994 | Riggle et al. | |
| 5,520,273 A | 5/1996 | Moribayashi | |
| 5,528,945 A * | 6/1996 | Okada | F02N 15/023 74/7 A |
| 5,549,011 A | 8/1996 | Shiga et al. | |
| 5,706,700 A * | 1/1998 | Takagi | F02N 15/023 188/82.84 |
| 7,721,987 B2 | 5/2010 | Hayashi | |
| 7,861,836 B2 | 1/2011 | Shirataki et al. | |

(Continued)

FOREIGN PATENT DOCUMENTS

CN            20101315 Y      1/2007

*Primary Examiner* — David M Fenstermacher
(74) *Attorney, Agent, or Firm* — Howard & Howard Attorneys PLLC

(57) ABSTRACT

In a permanently engaged starter system (20), a one-way clutch (40) is located between a starter motor (21) and a starter gear (54) for initiating the start of an internal combustion engine. The clutch (40) can include a starter gear (54), an outer race (56), an inner race (60), a roller cage (42) supporting a plurality of roller disks (46), and at least one spring (52). The roller cage (42) can include an enlarged inertia ring supported adjacent to a radially outwardly located peripheral edge (50) for retarding rotational movement of the roller cage (42) relative to the inner race (60) in response to acceleration of the starter motor (21). The spring (52) biases the roller cage (42) relative to the inner race (60) toward a disengaged clutch position, such that the plurality of roller disks (46) engage the inner race (60) and are spaced from the outer race surface (56).

15 Claims, 3 Drawing Sheets

(56) References Cited

U.S. PATENT DOCUMENTS

| | | | |
|---|---|---|---|
| 8,037,986 B2 * | 10/2011 | Takasu | F16D 41/064 |
| | | | 192/113.32 |
| 8,393,453 B2 | 3/2013 | Shirataki et al. | |
| 8,397,888 B2 | 3/2013 | Shirataki et al. | |
| 8,448,767 B2 | 5/2013 | Ando | |
| 8,485,332 B2 | 7/2013 | Shirataki et al. | |
| 2009/0183594 A1 * | 7/2009 | Usami | F02N 15/023 |
| | | | 74/7 C |
| 2013/0074652 A1 * | 3/2013 | Gray | F16D 41/066 |
| | | | 74/7 C |
| 2013/0186235 A1 * | 7/2013 | Morimoto | B60K 6/365 |
| | | | 74/7 C |
| 2015/0198131 A1 * | 7/2015 | Showalter | F16D 41/067 |
| | | | 74/7 C |
| 2015/0260144 A1 * | 9/2015 | Sasaki | F02N 15/023 |
| | | | 74/7 C |
| 2015/0300310 A1 * | 10/2015 | Seillier | F02N 15/025 |
| | | | 74/7 C |

* cited by examiner

ANTI-KICKBACK CLUTCH FOR STARTER GEAR

FIELD OF THE INVENTION

The present invention relates to a one-way clutch of a roller type used as a part such as a torque transmitting element, and more particularly to a roller type one-way clutch used with a starter motor for initiating the start of an engine.

BACKGROUND

Known roller type one-way clutches generally include an outer race, an inner race, a roller disposed in between the inner race and the outer race and adapted to transmit torque between an outer surface of the inner race and an inner surface of the outer race. Currently known roller type one-way clutches include springs for biasing the rollers. Roller type one-way clutches have previously been disclosed in U.S. Pat. No. 8,485,332; U.S. Pat. No. 8,448,767; U.S. Pat. No. 8,397,888; U.S. Pat. No. 8,393,453; U.S. Pat. No. 7,861,836; U.S. Pat. No. 7,721,987; U.S. Pat. No. 5,549,011; U.S. Pat. No. 5,520,273; U.S. Pat. No. 5,279,400; U.S. Pat. No. 2,421,814; and Chinese Publication No. CN201013515Y. A roller type one-way clutch can be used with a permanently engaged starter. The one-way clutch can be located between a starter motor and a starter ring gear. The clutch can transfer drive torque from the starter motor to an engine. Current roller type clutch technology presents the problem of "kicking back". When the engine stops, the engine can rotate backward for up to 45 degrees. Current roller type one-way clutches allow this motion to be transferred to the starter motor, causing damage to the starter motor. It would be desirable to reduce or eliminate kickback rotation through the clutch to reduce or prevent damage to the starter motor.

SUMMARY

To overcome the limitation of current technology, the present invention uses roller disks for transferring torque through the clutch assembly. The roller disks can be disengaged in order to prevent motion from being transferred from the rotating starter gear to the starter motor. This eliminates kickback rotation from the engine being transferred through the clutch to the starter motor thereby preventing damage to the starter motor.

A roller clutch can be located between an electric starter motor and a starter gear. The roller clutch can include a spring centered roller cage. The roller cage can have an integral inertia ring operably associated therewith. When initiating an engine start, the acceleration of the starter motor will cause a rapid movement of the inner race and the roller cage of the roller clutch. The inertia of the inertia ring integral with the roller cage would retard movement of the roller cage causing engagement of the one-way clutch allowing driving rotation of the starter gear by the electric starter motor. With a permanently engaged starter (PES) soon after the engine starts, the ring gear which is engaged with the starter gear comes to rest. At that time, the springs will cause the rollers supported by the roller cage to center the rollers causing the rollers to no longer be in a driving relationship with respect to the outer race. With this clutch, the kick back will rotate the starter gear but the rollers will not be engaged and the motion will not be transferred to the starter motor.

A roller type one-way clutch assembly can include a roller cage rotatable around a primary axis. The roller cage can be defined by a cylindrical wall having a plurality of recesses. The cage can include a radially outwardly extending flange at one end of the cylindrical wall and an outer peripheral shoulder defining an inertia ring extending in an axial direction adjacent an outer peripheral edge of the flange. The plurality of recesses defined within the cylindrical wall can receive a corresponding plurality of cylindrical rollers. The plurality of cylindrical rollers can be rotatable within the corresponding plurality of recess formed in the cylindrical wall to transmit torque through the clutch assembly. The roller type one-way clutch assembly can further include at least one spring. The at least one spring can be fixially secured to the roller cage for biasing the plurality of cylindrical rollers toward a disengaged position.

A roller type one-way clutch assembly can include a starter gear, an outer race surface, a roller cage, a plurality of cylindrical rollers supported by the roller cage, an inner race surface, and at least one spring for biasing the roller cage and supported cylindrical rollers toward a disengaged position resting against the inner race surface and spaced from the outer race surface. The starter gear can be rotatable around a primary axis and engageable with a starter ring gear. The outer race surface can be rotatable around the primary axis and fastened to the starter gear. The outer race surface can be defined by an inner cylindrical surface operably associated with the starter gear hub. The outer race surface can be operably engaged by the plurality of roller disks. The roller cage can be rotatable about the primary axis. The roller cage can be defined by a cylindrical wall portion having a plurality of recesses formed therein and a radially outwardly extending flange with a peripherally enlarged shoulder defining an inertia ring. The plurality of recesses formed in the cylindrical wall can receive a corresponding plurality of roller disks. The inner race surface can be formed on an external portion of an internal nut-shaped drive hub having a plurality of generally flat surfaces. By way of example and not limitation, the external portion of the internal nut-shaped drive hub can be formed similar to a nut having a plurality of generally flat surfaces. The outer flange can extend radially away from the primary axis. The peripheral shoulder can extend longitudinally to form an inertia ring to affect the rotational movement of the roller cage. The plurality of roller disks can be rotatable within the plurality of recesses formed in the cylindrical wall. The roller disks can transmit torque from the inner race to the outer race in response to the roller disk being wedged into non-rolling engagement between a reduced clearance spaced located at the joint between two adjacent generally flat surfaces of the nut-shaped drive hub and the outer race. The inner race can be spaced from the outer race with a maximum clearance adjacent a central portion of each generally flat side of the nut-shaped drive hub and a minimum clearance adjacent each joint between two adjacent generally flat surfaces of the nut-shaped drive hub. The nut-shaped drive hub can be located radially inside of the outer race. The inner race can be coaxially arranged with respect to the outer race for relative rotational movement in an engaged driving mode of operation and a disengaged independent mode of operation. The nut-shaped drive hub can include an inner race surface formed on an exterior surface of the nut-shaped drive hub and an interior surface having a plurality of splines. The interior surface of the nut-shaped drive hub can be splined for receiving the starter motor shaft. The exterior surface of the nut-shaped drive hub can be engageable with the plurality of roller disks for trapping the plurality of roller disks in wedged non-rolling engagement between the nut-shaped drive hub and the outer race associated with the starter gear for driving the starter gear to start the engine in response to rotation of the electric motor to rotate the nut-shaped drive hub in cooperation with the inertia ring retarding initial rotation of the roller cage. At least one spring can be fixially secured between the roller cage and the nut-shaped drive hub for biasing the plurality of roller disks toward a disengaged position with the roller disks located adjacent to a central portion of each generally flat side of the nut-shaped drive hub and spaced radially from contact with the outer race to prevent transfer of rotation from the starter gear through the nut-shaped drive hub to the starter motor.

A method of assembling a roller type one-way clutch assembly can include providing a starter gear having an outer race surface, inserting a roller cage within the outer race surface, the roller cage having a cylindrical wall portion with a plurality of recesses for receiving a corresponding plurality of cylindrical rollers and a flange portion adjacent one end of the cylindrical wall portion supporting an enlarged inertia ring adjacent an outer peripheral edge of the flange portion, installing a nut-shaped hub in operable engagement with the roller cage, the nut-shaped hub having an inner race surface with a plurality of generally flat surfaces, and biasing the roller cage with at least one spring toward a disengaged position with the cylindrical rollers positioned in contact with a central portion of the generally flat surface of the nut-shaped hub and spaced radially from contact with the outer race surface of the starter gear to prevent transfer of rotation from the starter gear through the nut-shaped drive hub to the starter motor. The exterior surface of the nut-shaped drive hub can be engageable with the plurality of roller disks for trapping the plurality of roller disks in wedged non-rolling engagement between the nut-shaped drive hub and the outer race associated with the starter gear for driving the starter gear to start the engine in response to rotation of the electric motor to rotate the nut-shaped drive hub in cooperation with the inertia ring retarding initial rotation of the roller cage. The interior surface of the nut-shaped hub can be splined for receiving the starter motor shaft.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
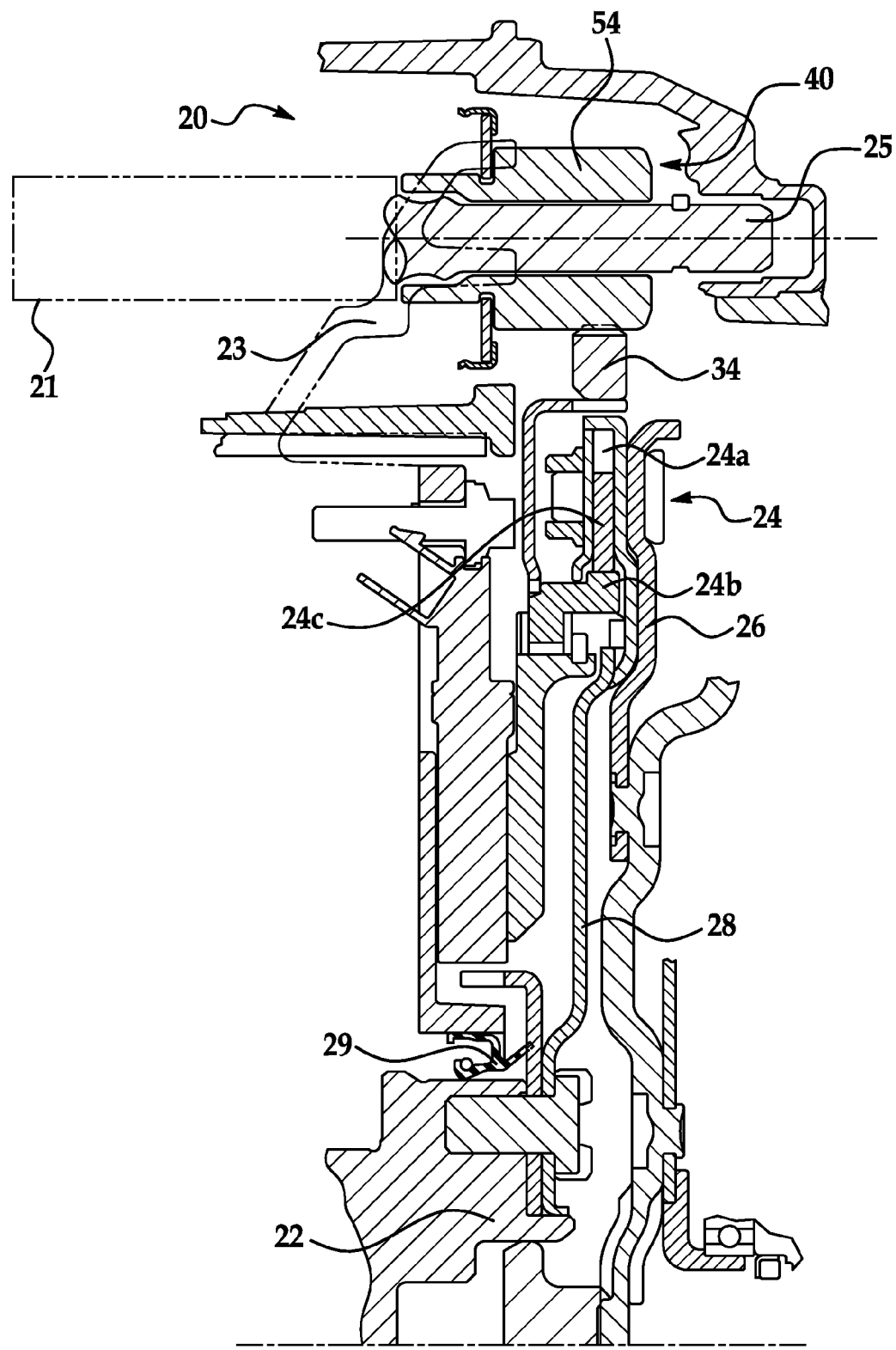
FIG. 1 is a sectional view of a permanently engaged starter using a roller type one-way clutch.
Figure 2:
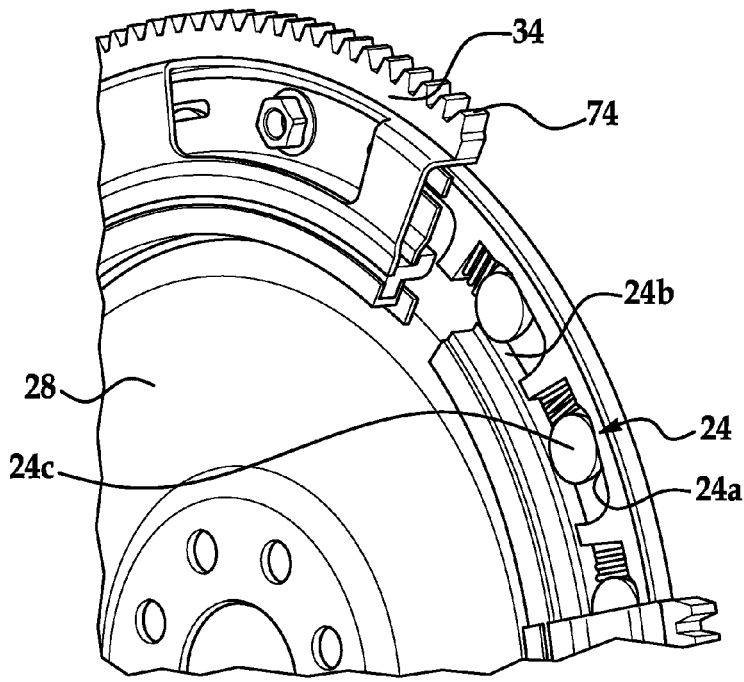
FIG. 2 is a partial view of a flywheel showing bearings and a starter ring gear for attachment to the roller type one-way clutch.

Referring briefly to FIGS. 1-2, a permanently engaged starter system 20 using a roller type one-way clutch 40 is shown for use in a motor vehicle. As illustrated in FIGS. 1-2, the clutch assembly 40 can act as a torque transfer system between rotatable components associated with an internal combustion engine of a vehicle. The vehicle can be configured to have an internal combustion engine as a first source of motive power in a standard hydrocarbon fuel engine powered vehicle configuration. If desired, a second source of motive power can be provided by an electric motor in a hybrid vehicle configuration. During operation of the vehicle, it is contemplated that the internal combustion engine can frequently be stopped in an attempt to improve fuel efficiency. The internal combustion engine can be stopped once a controller determines that the vehicle speed has been below a predetermined threshold for a predetermined amount of time, such as when the vehicle is idling at a stoplight. Depending on the configuration desired and mode of operation, the vehicle can be propelled solely through power provided by the electric motor, through power provided by both the internal combustion engine and the electric motor, or through power provided solely by the internal combustion engine. It should be recognized that the internal combustion engine can require frequent restarting in a hybrid vehicle to provide additional power and/or to charge the battery for the electric motor.

As illustrated in FIG. 1, a starter system 20 can include a starter motor 21 selectively operable to transfer torque to a crankshaft 22 of the internal combustion engine when the controller signals for starting or re-starting of the internal combustion engine. The starter motor 21 can include a starter gear 54 which can be in constant meshed engagement with a starter ring gear 34 fixed to a flex plate 26. The flex plate 26 can be drivingly connected to a back plate 28. The ring gear 34 and the starter gear 54 can each include a plurality of teeth. A preferred ratio of the number of teeth on the ring gear 34 to the number of teeth on the starter gear 24 can be 15:1. The ring gear 34 can be attached to the crankshaft 22 of the internal combustion engine, such that the ring gear 34 can rotate at the same speed as the internal combustion engine.

The flex plate 26 or flywheel, as illustrated in FIGS. 1-2, can be rotated to initiate the rotation of the internal combustion engine. The ring gear 34 can be formed as one piece with the flex plate 26 or can be a separate component fixed for rotation thereto. The flex plate 26 can include a central aperture 27 in receipt of a portion of a flywheel clutch assembly 24 including an outer race 24a, an inner race 24b, and a plurality of spring biased rollers 24c. The flywheel clutch assembly 24 selectively transfers torque between the flex plate 26 and the crankshaft 22. The crankshaft 22 can be enclosed by a crankcase 23 and can include a rotary shaft seal 29 for sealing the end bearings of the crankshaft 22 that project outwardly within the crankcase 23. The flywheel clutch assembly 24 can be used in a starter system 20 or a permanently engaged starter system, where the ring gear 34 is always engaged with the starter gear 54 and the flex plate 26.

Figure 3:
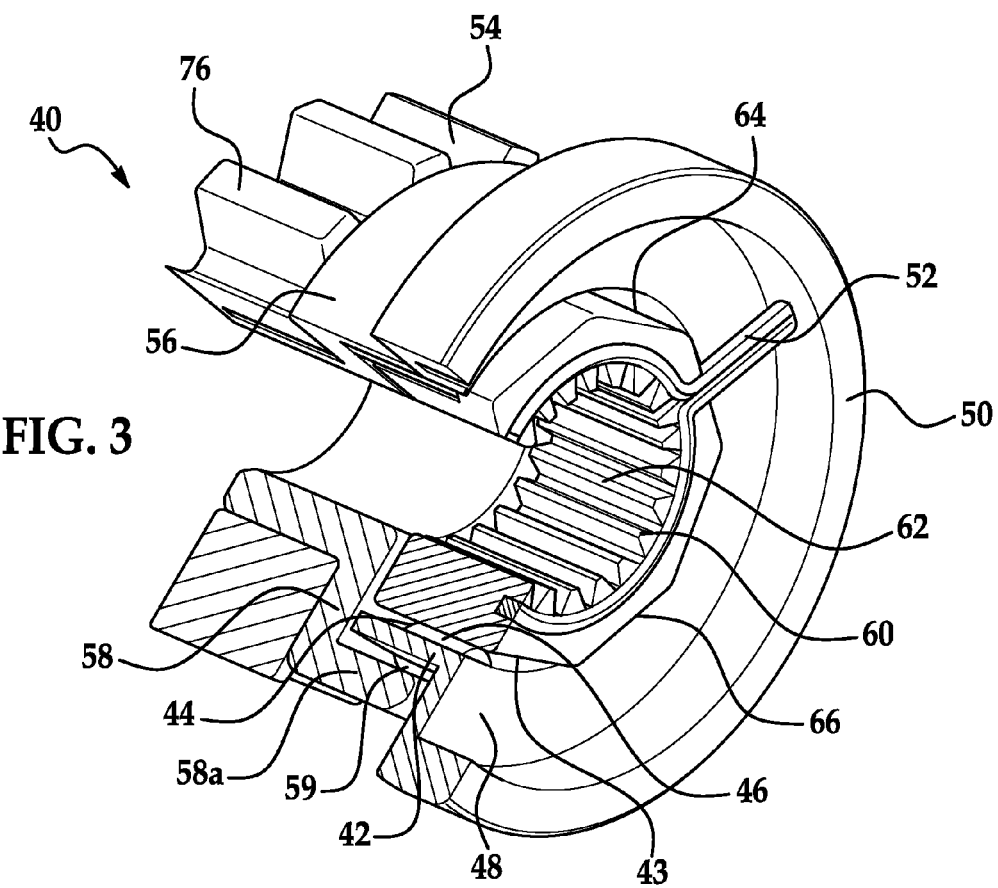
FIG. 3 is a cross sectional view of the roller type one-way clutch for connection between a starter motor and a starter gear.

The improvement of a roller type one-way clutch 40 as illustrated in FIG. 3 can be installed as an internal portion of the starter gear for engagement with the ring gear 34. Referring now to FIGS. 3-6, an improvement of a roller type one-way clutch 40 is shown. As best illustrated in FIG. 3, the clutch assembly 40 can include a roller cage 42 having a cylindrical wall portion with a plurality of recesses 44 formed therein, a corresponding plurality of roller disks 46 mounted within the plurality of recesses 44, an outwardly extending flange portion 48 connected to the cylindrical wall portion, an inertia ring 50 connected to an outer peripheral edge of the flange portion, and at least one spring 52 connected between the roller cage 42 and the inner race 60. The roller cage 42 can be rotatable around an axis of rotation and can include a cylindrical wall portion having a plurality of recesses 44, an outer flange 48, and a peripheral shoulder or inertia ring 50. The cylindrical wall portion including the plurality of recesses 44 can receive the corresponding plurality of roller disks 46 with one roller disk 46 per recess 44 as best seen in the detail of FIG. 6. The outer flange 48 can extend radially away from the rotational axis to support the peripheral shoulder or inertia ring 50 at a radial distance from the rotational axis. The inertia ring or peripheral shoulder 50 can extend longitudinally from the outer periphery of the flange 48. The peripheral shoulder or inertia ring 50 can retard the rotational movement of the cage 42 via its inertia during acceleration of the starter motor 21. Each of the plurality of roller disks 46 can be rotatable within a corresponding recess 44 of the cylindrical wall portion and can transmit torque between the inner race member 60 and outer race member 56 of the clutch assembly 40 when trapped in a non-rolling wedged position between the inner race 60 and outer race 58.

Figure 4:
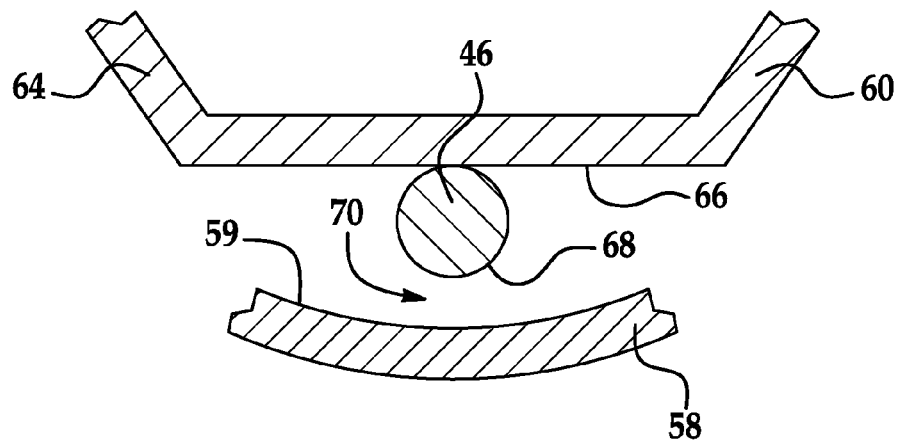
FIG. 4 is a simplified detail schematic view showing a inner race, an outer race, and an exemplary roller disk in a clutch disengaged position of the roller type one-way clutch.
Figure 5:
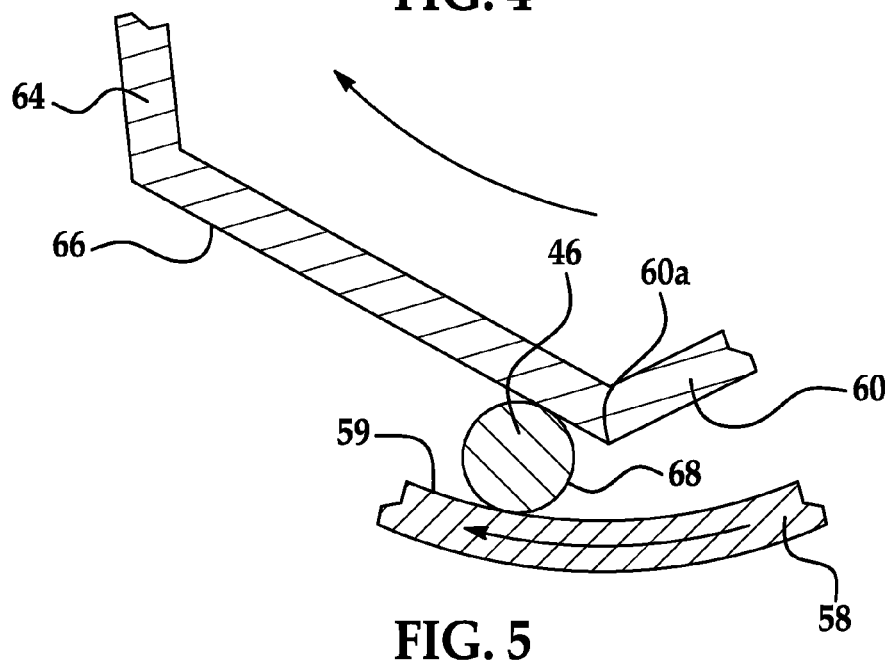
FIG. 5 is a simplified detail schematic view showing the inner race, the outer race, and an exemplary roller disk in a clutch engaged position of the roller type one-way clutch.
Figure 6:
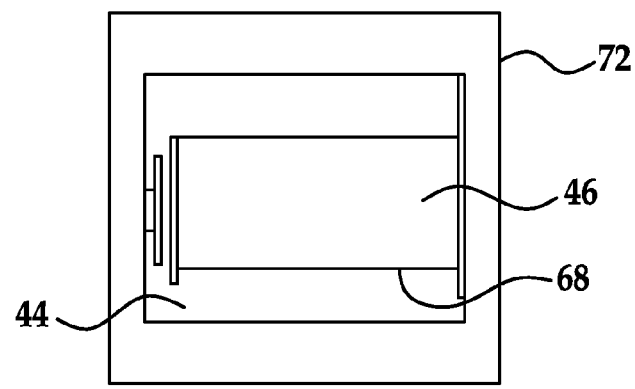
FIG. 6 is a partial view of a roller cage of the roller type one-way clutch showing the cylindrical wall portion with an exemplary one of a plurality of recesses of the roller cage for supporting an exemplary one of a plurality of roller disks.

As best illustrated in FIGS. 4-5, the plurality of roller disks 46 can include a periphery 68 engaged with the inner race member 60 when in a disengaged clutch position illustrated in FIG. 4 and an engaged clutch position illustrated in FIG. 5, while being spaced from the outer race surface of the outer race member 56 when in the disengaged clutch position of FIG. 4 and engaged with the outer race member 56 when in the engaged clutch position of FIG. 5. The clutch assembly 40 can include an inner race member 60 and an outer race member 56, which are rotatable independently from one another when the clutch 40 is disengaged as shown in FIG. 4 and rotatable with one another when the clutch 40 is engaged as shown in FIG. 5. The inner race member 60 can support and rotate the spring biased roller cage 42 until the starter motor 21 acceleration is sufficient to overcome the spring bias, in cooperation with the affect of the inertia ring, allowing the inner race member 60 to rotate faster than the roller cage 42 driving the roller disks 46 radially outward into locked engagement with respect to the outer race member 56. The roller cage 42 can support the plurality of roller disks 46 for transmitting torque in one direction from the inner race member 60 to the outer race member 56.

The outer race member 56 can be connected to the starter gear 54 via splines to rotate as a single unitary member. As illustrated in FIG. 4, the outer race member 56 can include an outer race flange 58 extending longitudinally outwardly from the starter gear 54. An inner surface of the outer race flange 58 defines the outer race surface 59 which can be engaged by the periphery 68 of the plurality of roller disks 46 when the clutch is in the engaged position as illustrated in FIG. 5. The periphery 68 of the plurality of roller disks 46 engage with an exterior surface of the inner race 60 defining the inner race surface 64 while in the engaged clutch position and the disengaged clutch position. The roller disks 46 are located adjacent a central portion of a relatively flat planar surface of the inner race surface 64 and spaced from engagement with the outer race surface 59 of the outer race flange 58 when the clutch assembly 40 is in a disengaged position. The roller disks 46 move radially outwardly into contact with the outer race surface and move along the relatively flat planar surface of the inner race surface 64 toward a position adjacent an edge defined between two adjacent relatively flat planar surfaces of the inner race surface when in the engaged clutch position. As best illustrated in FIG. 4, when the plurality of roller disks 46 is in engagement with only the inner race 60, a gap 70 can be defined between the periphery 68 of the plurality of roller disks 46 and the outer race 56. The diameter of the outer race flange 58 can be greater than the diameter of the wall 43 of the cage 42 defining the cylindrical recess 44 such that the cage 42 rotates independently from but within the diameter of the outer race flange 58.

As shown in FIG. 3, an improvement of a roller type one-way clutch assembly 40 is shown. The clutch assembly 40 can include a starter gear 54, an outer race member 56, a roller cage 42 having a plurality of recesses 44 for supporting a corresponding plurality of roller disks 46, an inner race member 60, and at least one spring 52. The starter gear 54 can be engageable with the ring gear 34 and can be fastened to the outer race member 56 for rotation as a single unitary member. As shown in FIG. 3, the starter gear 54 can be rotatable around an axis of rotation and can include a plurality of teeth 76 for engagement with a plurality of teeth 74 located on the ring gear 34, as illustrated in FIG. 2. The teeth 76 of the starter gear 54 can mesh in engagement for rotation with the teeth 74 of the ring gear 34. The outer race member 56 can be fixedly located coaxial with respect to the starter gear 54. The outer race member 56 can include a flange portion 58 extending radially outwardly and supporting an enlarged cylindrical wall portion 58a extending longitudinally outwardly from the starter gear 54. The enlarged cylindrical wall portion 58a can have an inner surface defining the inner race surface 59 operably engageable with a periphery 68 of the plurality of roller disks 46 when in the clutch engaged position of FIG. 5.

The roller cage 42 can be rotatable around the rotational axis and can include a cylindrical wall portion having a plurality of recess 44 formed therein as best seen in FIG. 6. The roller cage 42 can also include a radially outwardly extending flange 48 supporting an inertia ring to define a peripheral shoulder 50. The cylindrical wall portion of the roller cage 42 having a plurality of recesses 44 can receive a corresponding plurality of roller disks 46. The roller disks 46 can be rotatable and engageable with the inner race member 60 and the outer race member 56. The outer flange portion 48 of the roller cage 42 can extend radially outwardly from the rotational axis, while the peripheral shoulder 50 can extend longitudinally outwardly from the starter gear 54. The inertia ring defining the peripheral shoulder 50 can retard rotational movement of the roller cage 42, allowing the inner race member 60 to rotate relative to roller cage 42, depending on acceleration of the driving shaft of the starter motor 21 overcoming a biasing force of the at least one spring 52.

Each of the plurality of roller disks 46 can be rotatable with respect to the corresponding recess 44 within the cylindrical wall portion of the roller cage 42. The roller disks 46 can become wedged in non-rolling contact between the inner race surface and the outer race surface to transmit torque in one direction, from the inner race member 60 to the outer race member 56 in response to acceleration of the driving shaft of the starter motor 21 during startup. The plurality of roller disks 46 are initially held against the inner race surface adjacent a central location along a corresponding flat planar surface of the nut-shaped inner race member 60 as best seen illustrated in the detail of FIG. 4, During acceleration of the driving shaft of the starter motor 21 at startup, the roller disks move along the flat planar surface toward an edge or corner 60a defined between two adjacent flat planar surfaces and are driven radially outwardly into wedged non-rolling engagement with the outer race member 56 to transfer torque and rotation from the inner race member 60 to the outer race member 56 as best seen illustrated in the detail of FIG. 5. As illustrated in FIG. 4, the inner race member 60 can be radially spaced away from the outer race surface 59 of the outer race member 56. The inner race member 60 can be coaxial with the outer race member 56 for relative rotational movement with respect to one another when the clutch is in the disengaged position of FIG. 4 and for driving rotational movement of both inner and outer race members 60, 56 together when the clutch is in the engaged position of FIG. 5. The inner race member 60 can include an interior surface 62 and an exterior surface 64. The exterior surface 64 can be engageable with the periphery 68 of the plurality of roller disks 46 when in both the engaged and disengaged positions of the clutch. The interior surface 62 can be splined for connection to the driving shaft 25 of the starter motor 21 as best seen in FIG. 3. The at least one spring 52 can be secured to the roller cage 42. The at least one spring 52 acts to prevent rotational movement of the cage 42 relative to the outer race 59 by urging the plurality of roller disks 46 to be biased into a centered position in contact with the planar surface 66 of the inner race 60 while being spaced from the outer race 59. The plurality of roller disks 46 can be non-rotatable when in a centered position. The periphery 68 of the plurality of roller disks 46 can be in engagement with the exterior surface 64 of the inner race 60 while being spaced from engagement with the inner surface 59 of the outer race flange 56 when in the normal spring biased position. The plurality of roller disks 46 move along the planar surface 66 of the inner race 60 in response to acceleration of the inner race 60 by the starter motor 21 while the roller cage 42 is subject to the drag force of the inertia ring located at the peripheral shoulder 50.

As illustrated in FIG. 3, the roller cage 42 can define a cylindrical wall portion having a plurality of recess 44 for holding the plurality of roller disks 46. The roller cage 42 can include an outer flange 48 extending radially away from the primary axis with an inertia ring located at or adjacent to a peripheral shoulder 50 extending longitudinally from an outer peripheral edge of the outer flange 48. The cylindrical wall portion of the roller cage 42 includes a plurality of recesses 44 for receiving a corresponding plurality of roller disks 46 to transmit torque from the inner race member 60 to the outer race member 56. Each roller disk 46 can be cylindrical in shape such that the diameter of the roller disk, or outer periphery surface 68, is engageable with the exterior surface 64 of the inner race 60 when in the clutch engaged and clutch disengaged positions, while being engageable with the inner surface 59 of the outer race flange 58 only in the clutch engaged position. As best seen in FIG. 6, the cylindrical wall portion of the roller cage 42 includes a plurality of recesses 44 corresponding to the plurality of roller disks 46 located along the cylindrical wall portion 43 of the cage 42. As best illustrated in FIGS. 3-6, each roller disk 46 has a rotational axis parallel with the primary axis of the clutch assembly 40. The plurality of recesses 44 prevent longitudinal, radial, and tangential dislodgement of each roller disk 46 in cooperation with pins extending through a rotational axis of each roller disk 46 with outer ends secured to the cylindrical wall portion 43 of the roller cage 42. It should be recognized that other methods of assembling the plurality of roller disks 46 within the plurality of recesses 33 is contemplated to be within the scope of the invention. Each of the plurality of recesses 42 can be substantially rectangular for holding the corresponding roller disk 46. The roller disk 46 can be encircled by four sides of the recess 44 to prevent the roller disk 46 from being dislodged. Each of the plurality of roller disks 46 can rotate independently from one another when supported within the plurality of recesses 44 of the roller cage 42.

When the clutch assembly 40 is in a driving position, the shaft 25 of the starter motor 21 can include splines to be received by the interior surface 62 of the inner race 60. As illustrated in FIG. 3, the interior surface 62 of the inner race 60 can include complementary splines to provide a fixed rotational connection between the shaft 25 of the starter motor 21 and the inner race 60, while allowing some axial movement between the shaft 25 of the starter motor 21 and the inner race 60 to account for manufacturing tolerances. As illustrated in FIG. 3, the exterior surface 64 of the inner race 60 can include a plurality of planar surfaces 66 for wedging the plurality of roller disks 46 and preventing rotation of the plurality of roller disks 46 when in the driving position with respect to the outer race 56. By way of example and not limitation, as illustrated in FIG. 3, one embodiment of the inner race 60 can include eight planar surfaces 66. Each of the plurality of planar surfaces 66 can be engageable with the periphery 68 of a corresponding roller disk 46. The cylindrical wall portion 43 of the roller cage 42 can include a plurality of recesses 44 to receive the corresponding plurality of roller disks 46 for operable engagement with the inner race 60. After activation of the starter motor 21 causes rotation of the shaft 25, the shaft 25 accelerates the inner race 60 during startup such that the inner race 60 rotates rapidly. The inertia ring formed adjacent the outer peripheral shoulder 50 of the roller cage 42 increases the inertia of the roller cage 42, retarding the rotational movement of the roller cage 42 relative to the inner race 60, such that the plurality of roller disks 46 move along the corresponding planar surfaces 66 toward an edge or corner 60a to be trapped or wedged in non-rolling engagement between the inner race 60 and the outer race 56. The at least one spring 52 can act to normally bias the inner race 60 and the cage 42 toward a centered position with respect to the planar surfaces 66 spacing the roller disks 46 radially from engagement with the outer race 56. In response to rotation of the inner race 60, the at least one spring 52 is flexed to allowing for the retarded rotational movement of the roller cage 42 with respect to the inner race 60. In response to the retarded rotation of the roller cage 42 with respect to the inner race 60, the plurality of roller disks 46 rotate along the planar surfaces 66 of the inner race 60 until the periphery 68 of the roller disks 46 wedges into fixed engagement between the outer race surface 59 of the outer race 59 and the inner race surface 66 of the inner race 60 as illustrated in FIG. 5. Each corner or edge of adjacent planar surfaces 66 can become tightly locked to the corresponding roller disk 46 creating a torque transfer drive path between the inner race 60 and the outer race 56 through the roller disks 46.

As best illustrated in FIG. 5, when both the inner race 60 and the outer race 56 are in the clutch engaged position with the periphery 68 of the plurality of roller disks 46 wedged therebetween, torque can be imparted from the inner race 60 to the outer race 56 so that the inner race 60 and the outer race 56 rotate in the same direction as a single unit. The at least one spring 52 is in a flexed position when the clutch assembly 40 is in the clutch engaged driving position. The outer race 56 can be fastened to the starter gear 54 through a spline surface interface to be fixed for rotational movement together, while allowing for some axial movement to accommodate manufacturing tolerances. As best illustrated in FIG. 3, the outer race 56 can be fixially secured to an inner surface of the starter gear 54, by way of example and not limitation, such as through complementary surfaces having mating splines. The roller cage 42, inner race 60, outer race 56, and starter gear 54 can be coaxial and rotatable around a common rotational axis. Rotation of the starter gear 54 commences in response to transfer of torque from the inner race 60 to the outer race 56 through the roller disks 46 when in the clutch engaged position of FIG. 5 for driving rotation of the ring gear 34. As shown in FIGS. 1 and 3, the ring gear 34 can include teeth 74 engageable with teeth 76 located on the starter gear 54 for driving rotation of the crankshaft 22 to initiate the start of the engine. After starting the engine, the engine can continue to run while the starter motor 21 does not continue to rotate. The clutch assembly 40 imparts the starter drive torque in only one direction, from the starter motor 21 to the engine. Reverse drive torque, or kick back from the engine to the starter motor 21 is prevented with the clutch assembly 40 in the disengaged position as shown best in FIG. 4.

In a disengaged clutch position or neutral position, the clutch assembly 40 can prevent torque from being transferred in the direction from the engine to the starter motor 21, sometimes referred to as kick back rotation. An engine being initiated by a crankshaft 22 can kick back to rotate in a direction opposite to the initial rotational direction imparted from the outer race 56 such that the crankshaft 22 rotates in the opposite direction. The reverse rotational movement of the crankshaft 22 can be imparted to the starter ring gear 34, the starter gear 54, and the outer race 56. The at least one spring 52 acts on the clutch assembly 40 to move the roller cage 42 and supported roller disks 46 to the clutch disengaged position, where the roller disks 46 are positioned adjacent a central portion of the planar surfaces 66 and spaced radially from the outer race surface 59 so that the reverse rotational movement is not transferred through the inner race 60 back to the starter motor 21. In the clutch disengaged position, the inner race 60 and the roller cage 42 are isolated from driving movement being transferred from the outer race 56 to the inner race 60 through the roller disks 46. The at least one spring 52 can bias the roller cage toward the neutral position preventing transfer of rotation between the inner race 60 and outer race 56. Acceleration of the shaft 25 of the starter motor 21 during startup, overcomes the bias of the at least one spring 52, while the inertia ring operably associated with the roller cage 42 operates to retard the rotational movement of the roller cage 42 causing the roller disks to become wedged between the inner race 60 and outer race 56 in order to transfer torque from the inner race 60 to the outer race 56. The at least one spring can be fixedly secured to the roller cage 42 at one end and operably engageable with the inner race 60 at another end. By way of example and not limitation, the at least one spring 52 can be fixedly secured to the outer flange 48 of the cage 42 by a tab or any other suitable connection.

As illustrated in FIGS. 3-5, the exterior surface 64 of the inner race 60 can include a plurality of planar surfaces 66 such that each of the plurality of planar surfaces 66 can be engageable with a corresponding roller disk 46. When the at least one spring 52 is in a neutral position, the roller cage 42 is biased to move the roller disks 46 toward a central position of the planar surfaces 66 radially spaced from the outer race surface 59. The inner race 60, the roller cage 42, and the plurality of roller disks 46 can normally be in the neutral position isolated from rotational movement of the outer race 56. When the inner race 60 and roller cage 42 are isolated from being driven by movement of the outer race 56, the periphery 68 of the plurality of roller disks 46 are in engagement with the exterior surface 64 of the inner race 60 while being radially spaced from engagement with the outer race surface 59 of the outer race 56. As illustrated in FIG. 4, a gap 70 exists between the periphery 68 of the plurality of roller disks 46 and the outer race surface 59 of the outer race 56 when the clutch is in the disengaged position. When the plurality of roller disks 46 is not engaged with the outer race 56, the clutch assembly 40 is in a disengaged position and no torque can be transferred between the inner race 60 and the outer race 56 in either rotational direction.

The clutch assembly 40 helps to prevent any damage caused by torque transfer to the starter motor 21 from kick back, or reverse rotation, of the engine. When starting the engine by transferring torque in one direction from the starter motor 21, through the clutch assembly 40, and to the engine, kick back or reverse rotational movement can occur with respect to the original rotational movement imparted through the clutch assembly 40. Kick back or reverse rotational movement can also occur while the engine is stopping. The reverse rotational movement can be transferred through the starter ring gear 34, to the starter gear 54 and the outer race member 56. The normal biasing force of the at least one spring 52 prevents the inner race 60 and the plurality of roller disks 46 from rotating to engage the outer race surface 59 of the outer race 56 preventing transfer of torque from the outer race member 56 to the inner race member 60, thereby preventing the potentially damaging transfer of reverse rotational movement to the starter motor 21. The roller type one-way clutch assembly 40 disclosed prevents damage to the starter motor 21 and provides for a smoother operation of the vehicle.

A method of assembling the roller type one-way clutch assembly 40 can include providing a starter gear 54 having an axis of rotation and teeth operably engageable with teeth of a starter ring gear 34. The method can include fixedly attaching an outer race member 56 to the starter gear 54. A roller cage 42 can be inserted within the outer race surface 59 of the outer race member 56 along a common coaxial axis of rotation with the starter gear 54. The roller cage 42 can include a plurality of recessed 44 for supporting a corresponding plurality of roller disks. The outer race member 56 can include an outer race surface 59 engageable with the plurality of roller disks 46 when the clutch is in the engaged position. The roller cage 42 can include a radially outwardly extending flange 48 with respect to the common axis of rotation supporting an inertia ring adjacent to an outer edge of a peripheral shoulder 50 for retarding the rotational movement of the cage 42 relative to an inner race member 60 during acceleration of the shaft 25 of the starter motor 21. The method can also include providing an inner race member 60 with an outer peripheral surface with a plurality of substantially flat planar surfaces defining a nut-shaped member, and positioning the inner race member 60 along the common coaxial axis of rotation with the flat planar surfaces in supporting contact with the roller disks 46 of the roller cage 42. At least one biasing spring 52 can be connected between the roller cage 42 and the inner race member 60 for urging the roller disks toward a central portion of the substantially flat planar surfaces of the nut-shaped inner race member 60 and to be spaced radially from engagement with the outer race surface 59 of the outer race member 56 when the clutch is in the normal disengaged position. In operation, the clutch assembly 40 is driven from the normal disengaged position to the engaged position in response to acceleration of the shaft 25 of the starter motor 21 rotating the inner race member 60 while the inertia ring of the roller cage 42 retards rotation of the roller cage 42 sufficiently to overcome the urging of the at least one spring 52 for the roller disks 46 to roll along the substantially flat planar surfaces 66 until wedged in non-rolling engagement between an edge or corner of two adjacent substantially flat planar surfaces of the inner race member 60 and the outer race surface 59 of the outer race member 56 in order to transfer rotational torque from the inner race member 60 to the outer race member 56.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A roller type one-way clutch (40) for isolating a starter motor (21) from kickback rotation the starter motor (21) having a driving shaft (25) with an axis of rotation for startup torque transmission to an internal combustion engine, the roller type one-way clutch (40) comprising:
    an outer race surface (56);
    a starter gear (54) rotatable around the axis of rotation supporting the outer race surface (56) located coaxial with the starter gear (54), wherein the roller type one-way clutch (40) is located between the starter motor (21) and a starter ring gear (34) when the starter gear (54) is operably engaged to the starter ring gear (34);
    an inner race (60) having a nut-shaped surface with a plurality of generally flat planar surfaces;
    a roller cage (42) having a cylindrical wall portion with a plurality of recesses (44) supporting a corresponding plurality of roller disks (46) for engagement between the outer race surface (56) and the inner race (60), the roller cage (42) having a radially outwardly extending flange portion (48) adjacent one end of the cylindrical wall portion supporting an enlarged inertia ring adjacent an outer peripheral edge (50) of the flange portion (48) for retarding rotational movement of the roller cage (42) during acceleration of the starter motor (21); and
    at least one spring (52) secured between the roller cage (42) and the nut-shaped surface of the inner race (60) for biasing the plurality of roller disks (46) toward a disengaged position with respect to the outer race surface (56).

2. The roller type one-way clutch (40) of claim 1, wherein the nut-shaped surface of the inner race (60) rotates during acceleration of the starter motor (21), while the inertia ring retards initial rotation of the roller cage (42).

3. The roller type one-way clutch (40) of claim 1, wherein the inner race (60) traps the plurality of roller disks (46) in wedged non-rolling engagement between the nut-shaped surface of the inner race (60) and the outer race surface (56) for engaging the one-way clutch to start the engine in response to acceleration of the starter motor (21).

4. The roller type one-way clutch (40) of claim 1, wherein the disengaged position corresponds the roller disks (46) located adjacent to a central portion of the generally flat planar sides of the nut-shaped surface of the inner race (60) and spaced radially from contact with the outer race surface (56) to prevent transfer of rotation from the starter gear through the nut-shaped surface of the inner race (60) to the starter motor (21).

5. The roller type one-way clutch (40) of claim 1, wherein the outer race (56) further comprises:
    an outer race flange (58) extending radially away from the primary axis, the outer race flange (58) having an inner surface (59) engageable with the plurality of roller disks (46).

6. The roller type one-way clutch of claim 5, wherein the inner race (60) is radially spaced inwardly from the outer race flange (58) and arranged coaxially with respect to the outer race flange (58) for relative rotational movement therebetween, the inner race (60) having an exterior surface (64) and an interior surface (62), the exterior surface (64) engageable with the plurality of roller disks (46), the interior surface (62) splined for attachment with respect to the driving shaft of the starter motor (21).

7. The roller type one-way clutch (40) of claim 1, wherein a clutch engaged position occurs when the driving shaft (25) of the starter motor (21) accelerates during startup driving the inner race (60) relative to the roller cage (42), where initial rotation is retarded by the inertia ring, driving the roller disks (46) radially outward into wedged non-rolling contact with respect to the outer race surface (56) transferring rotational torque therethrough between the inner race (60) and outer race surface (56).

8. The roller type one-way clutch (40) of claim 1, wherein a clutch disengaged position occurs when the starter gear decelerates after engine startup allowing the roller cage to rotate relative to the inner race (60), where continued rotation is urged by the inertia ring, driving the roller disks (46) radially inward out of contact with respect to the outer race surface (56) preventing transfer of kickback rotation from the outer race surface (56) to the inner race (60).

9. The roller type one-way clutch (40) of claim 1, wherein the at least one spring (52) further comprises a leaf spring member extending between the roller cage (42) and the inner race (60).

10. In a permanently engaged starter system (20), a roller type one-way clutch (40) located between a permanently engaged starter motor (21) and a starter ring gear (34), the starter motor (21) rotating a driving shaft (25) with respect to a rotational axis, and the starter ring gear (34) for imparting torque from the roller type one-way clutch (40) to an internal combustion engine, the improvement of the roller type one-way clutch (40) comprising:
    a starter gear (54) mounted for rotation and operably engageable with the starter ring gear (34), the starter gear having an outer race surface (56) connected thereto;
    a roller cage (42) mounted for rotation independent of the starter gear (54), the roller cage having a cylindrical wall portion with a plurality of recesses (44) for receiving a corresponding plurality of roller disks (46), the roller cage (42) having a radially outwardly extending flange portion (48) connected to the cylindrical wall portion supporting an inertia ring adjacent to an outer peripheral edge (50) of the flange portion (48) for retarding rotational movement of the roller cage (42) during acceleration of the starter motor (21);

an inner race (60) defined by a nut-shaped portion having a plurality of generally flat planar surfaces with central portions spaced a greater distance from the outer race surface (56) than edges formed between two adjacent flat planar surfaces, the edges of the inner race (60) trapping the plurality of roller disks (46) in wedged non-rolling engagement between the nut-shaped surface of the inner race (60) and the outer race surface (56) in response to acceleration of the starter motor (21) for engaging the one-way clutch to start the engine; and at least one spring (52) secured between the roller cage (42) and the nut-shaped surface of the inner race (60) for biasing the plurality of roller disks (46) toward a disengaged position with respect to the outer race surface (56).

11. The roller type one-way clutch (40) of claim 10, wherein the disengaged position corresponds to the roller disks (46) located adjacent to a central portion of the generally flat planar sides of the nut-shaped surface of the inner race (60) and spaced radially from contact with the outer race surface (56) to prevent transfer of rotation from the starter gear through the nut-shaped surface of the inner race (60) to the starter motor (21).

12. The roller type one-way clutch of claim 10, wherein the inner race (60) is radially spaced inwardly from the outer race flange (58) and arranged coaxially with respect to the outer race flange (58) for relative rotational movement therebetween, the inner race (60) having an exterior surface (64) and an interior surface (62), the exterior surface (64) engageable with the plurality of roller disks (46), the interior surface (62) splined for attachment with respect to the driving shaft of the starter motor (21).

13. The roller type one-way clutch (40) of claim 10, wherein the at least one spring (52) further comprises a leaf spring member extending between the roller cage (42) and the inner race (60).

14. A method of assembling a roller type one-way clutch (40) engageable between a permanently engaged starter motor (21) and a starter ring gear (34), the starter motor (21) having a driving shaft (25) with an axis of rotation, and the starter ring gear (34) for imparting torque from the roller type one-way clutch assembly (40) to an internal combustion engine, the method comprising: providing a starter gear having an outer race surface (56); inserting a roller cage (42) within the outer race surface (56), the roller cage (42) having a cylindrical wall portion with a plurality of recesses (44) for receiving a corresponding plurality of cylindrical rollers (46) and a flange portion connected to the cylindrical wall portion supporting an enlarged inertia ring adjacent an outer peripheral edge of the flange portion;

installing an inner race (60) defined by a nut-shaped portion having a plurality of generally flat planar surfaces with central portions spaced a greater distance from the outer race surface (56) than edges formed between two adjacent flat planar surfaces, the edges of the inner race (60) trapping the plurality of roller disks (46) in wedged non-rolling engagement between the nut-shaped surface of the inner race (60) and the outer race surface (56) in response to acceleration of the starter motor (21) for engaging the one-way clutch to start the engine; and biasing the roller disks (46) supported by the roller cage (42) with at least one spring (52) toward a disengaged position with the cylindrical rollers (46) positioned in contact with a central portion of the generally flat planar surfaces of the nut-shaped surface of the inner race (60) and spaced radially from contact with the outer race surface (56) of the starter gear to prevent transfer of rotation from the starter gear through the nut-shaped portion of the inner race (60) to the starter motor (21).

15. A roller type one-way clutch (40) for isolating a starter motor (21) from kickback rotation, the starter motor (21) having a driving shaft (25) with an axis of rotation for startup torque transmission to an internal combustion engine, the roller type one-way clutch (40) comprising:

an outer race surface (56);

an inner race (60) having a nut-shaped surface with a plurality of generally flat planar surfaces;

a roller cage (42) having a cylindrical wall portion with a plurality of recesses (44) supporting a corresponding plurality of roller disks (46) for engagement between the outer race surface (56) and the inner race (60), the roller cage (42) having a radially outwardly extending flange portion (48) adjacent one end of the cylindrical wall portion supporting an enlarged inertia ring adjacent an outer peripheral edge (50) of the flange portion (48) for retarding rotational movement of the roller cage (42) during acceleration of the starter motor (21); and at least one spring (52) secured between the roller cage (42) and the nut-shaped surface of the inner race (60) for biasing the plurality of roller disks (46) toward a disengaged position with respect to the outer race surface (56);

wherein the at least one spring (52) further comprises a leaf spring member extending between the roller cage (42) and the inner race (60).

\* \* \* \* \*